(12) United States Patent
Hartwig

(10) Patent No.: US 10,016,926 B2
(45) Date of Patent: Jul. 10, 2018

(54) METHOD AND AN APPARATUS FOR BLOWING A CONTAINER IN A BLOWING MOULD

(71) Applicant: NESTEC S.A., Vevey (CH)

(72) Inventor: Klaus Hartwig, Nancy (FR)

(73) Assignee: Nestec S.A., Vevey (CH)

( * ) Notice: Subject to any disclaimer, the term of this patent is extended or adjusted under 35 U.S.C. 154(b) by 785 days.

(21) Appl. No.: 14/377,776

(22) PCT Filed: Feb. 1, 2013

(86) PCT No.: PCT/EP2013/051988
§ 371 (c)(1),
(2) Date: Aug. 8, 2014

(87) PCT Pub. No.: WO2013/117494
PCT Pub. Date: Aug. 15, 2013

(65) Prior Publication Data
US 2015/0054206 A1    Feb. 26, 2015

(30) Foreign Application Priority Data
Feb. 10, 2012 (EP) .................... 12154804

(51) Int. Cl.
*B29C 49/56* (2006.01)
*B29C 49/70* (2006.01)
(Continued)

(52) U.S. Cl.
CPC .............. *B29C 49/56* (2013.01); *B29C 49/12* (2013.01); *B29C 49/70* (2013.01); *B29K 2105/258* (2013.01); *B29L 2031/712* (2013.01)

(58) Field of Classification Search
CPC ..................................................... B29C 49/56
See application file for complete search history.

(56) References Cited

U.S. PATENT DOCUMENTS

| 5,064,366 A * | 11/1991 | Voss .................... B29C 33/202 425/450.1 |
| 2008/0063824 A1* | 3/2008 | Mangin ................ B65D 1/0207 428/35.7 |
| 2012/0031916 A1 | 2/2012 | Derrien et al. |

FOREIGN PATENT DOCUMENTS

| JP | H06335959 | 12/1994 |
| JP | 2004174853 | 6/2004 |

OTHER PUBLICATIONS

International Search Report for International Application No. PCT/EP2013/051988 dated May 6, 2013.
(Continued)

*Primary Examiner* — Larry Thrower
(74) *Attorney, Agent, or Firm* — K&L Gates LLP

(57) ABSTRACT

The invention concerns a method of manufacturing a container in a blowing mold, the blown container (22; 72; 82) having a neck and a bottom aligned along a longitudinal axis (A) and being enclosed within a blowing mold (12; 70; 80), the blowing mold comprising two side halves (12a, 12b; 70a, 70b; 80a; 80b) which are in contact with each other along a joint plane (P) when the blowing mold is in a closed position, the blown container having at least one transverse dimension in a longitudinal cross-section including the longitudinal axis, characterized in that the method comprises a step of moving apart the two side halves (12a, 12b; 70a, 70b; 80a; 80b) of the blowing mold along a substantially transverse direction, the two side halves being moved apart from the joint plane (P) over an overall distance that is less than the greatest transverse dimension of the blown container and that enables extraction of the blown container from the blowing mold (12; 70; 80).

12 Claims, 3 Drawing Sheets

(51) Int. Cl.
*B29C 49/12* (2006.01)
*B29K 105/00* (2006.01)
*B29L 31/00* (2006.01)

(56) References Cited

OTHER PUBLICATIONS

International Written Opinion for International Application No. PCT/EP2013/051988 dated May 6, 2013.

* cited by examiner

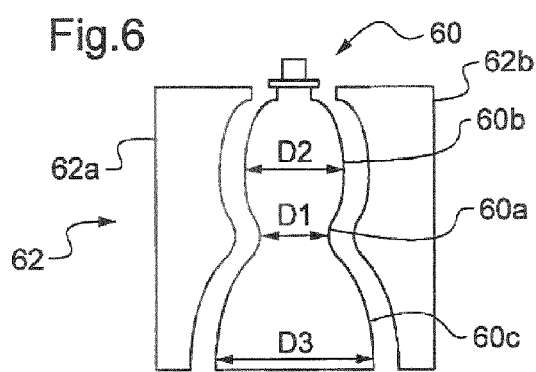
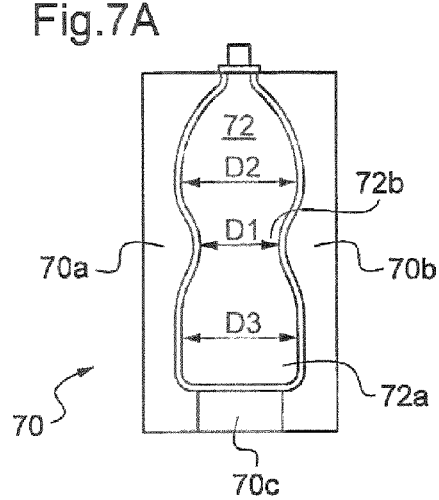
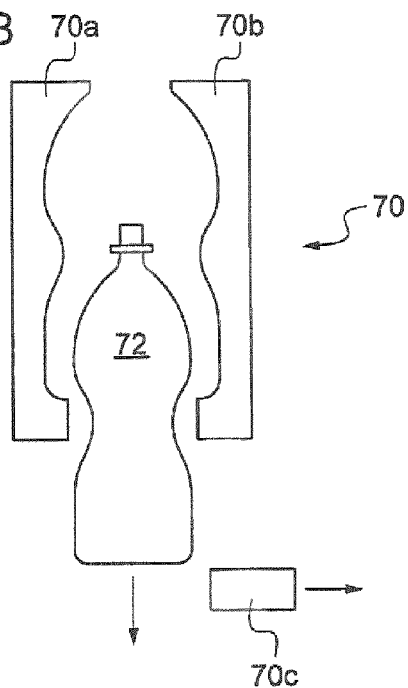
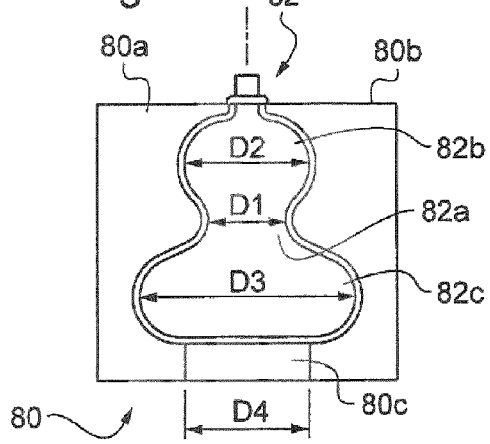
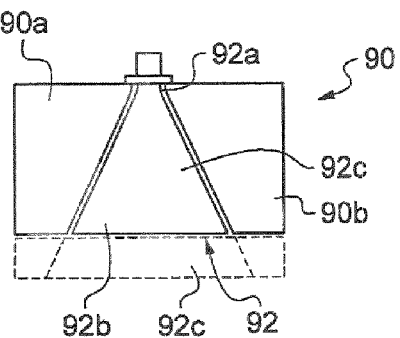

METHOD AND AN APPARATUS FOR BLOWING A CONTAINER IN A BLOWING MOULD

CROSS REFERENCE TO RELATED APPLICATIONS

The present application is a National Stage of International Application No. PCT/EP2013/051988, filed on Feb. 1, 2013, which claims priority to European Patent Application No. 12154804.4, filed Feb. 10, 2012, the entire contents of which are being incorporated herein by reference.

FIELD OF THE INVENTION

The invention relates to a method of blowing containers.

BACKGROUND

Plastic containers such as bottles of water are manufactured and filled according to different methods including blow moulding of stretch-blow moulding.

According to one of these known methods a plastic preform is first manufactured through a moulding process and then heated before being positioned inside a blowing mould.

The preform usually takes the form of a cylindrical tube closed at its bottom end and open at its opposite end.

Such a blowing mould typically comprises two mould halves and possibly a mould base.

The two mould halves are moved apart from each other in order to insert the preform therebetween. Next the mould is closed by moving back the two mould halves toward each other so as to enclose the preform within the mould.

The preform is then blown or stretch-blown along its longitudinal axis and radially so as to deform and come into contact with the inner walls of the mould, thereby resulting in a blown container.

Next the mould is opened again as described above and the blown container is taken out of the mould before a new preform is inserted.

In an industrial context there is a need to reduce the cycle time of the above-described operations.

SUMMARY OF THE INVENTION

In this respect, the method as defined in claim 1 achieves this need.

In the prior art, the two side halves are moved apart from the joint plane over an overall distance (sum of the distance travelled by each side half) that is at least equal to the greatest transverse dimension of the blown container. This is because the container is removed from the mould laterally.

The Applicant has discovered that it is possible to open the mould with a smaller magnitude than in the prior art and enable satisfactory removal of the blown container.

A smaller displacement of the side halves of the mould increases the cycle time of the whole manufacturing process. It also reduces the inertia caused by the movement of the side halves and, naturally, induces less friction and, therefore, lengthens the duration of life of mechanical components.

According to a possible feature, the overall distance further depends on the transverse dimension of the neck of the blown container.

The overall distance is adapted to the shape of the container and is set accordingly.

According to a possible further feature, the overall distance further depends on the transverse dimension of the neck of the blown container.

In some cases the transverse dimension of the neck may have an influence on the overall distance and, therefore, has to be taken into account when adjusting the overall distance over which both sides halves have to travel.

According to a possible feature depending on the latter, the overall distance is equal to the transverse dimension of the neck when said transverse dimension is less than the transverse dimension of the bottom and the transverse dimension of the container between the neck and the bottom is being kept constant or increasing.

Such a container has either a cylindrical shape or a conical or frusto-conical shape whose summit is located on the neck side. The great base of this conical or frusto-conical shape is located at the bottom of the container.

Alternatively, the container may have a squared-shape cross-section or any other cross-section shape: rectangular, triangular, etc.

According to a possible feature depending on any one of the previous features, the method includes filling of the container with a liquid.

The liquid may be injected into the container during its blowing or after.

According to another possible feature, prior to moving apart the two side halves of the mould, the method comprises steps of:
 stretching a preform placed within the blowing mould,
 injecting a liquid into the preform so as to cause expansion of said preform within the blowing mould while the preform is being stretched, thereby leading to the blown and liquid-filled container.

According to a possible feature, when the blown container has been filled with a liquid (whatever the method used), the method further comprises a step of capping the blown and liquid-filled container prior to extracting the latter. Capping the container is particularly useful to prevent liquid from splashing all over the container during the extraction or removal operation.

This is particularly useful when the container is extracted from underneath the mould.

According to a possible feature, the overall distance is equal to half the difference between the greatest and the smallest transverse dimensions of the blown container when the transverse dimension of the bottom is less than the greatest transverse dimension of the blown container.

If the transverse dimension of the container bottom is the greatest transverse dimension of the container the overall distance has to be adjusted differently.

According to another possible feature, the blown container comprises a waist having a first transverse dimension $D1$ that is less than a second and a third transverse dimension $D2$ and $D3$ respectively of two respective convex portions of the blown container arranged on either part of the waist.

This features a given configuration of a blown container provided with a waist.

According to a possible feature depending on the latter, the overall distance is equal to half the difference between the transverse dimensions $Di$ and $D1$, where $i$ equals 1 or 2.

According to a possible further feature depending on the latter, the difference between the transverse dimensions is $(D2-D1)$ if
 the convex portion with the transverse dimension $D2$ is arranged above the waist and either D2 is equal to or greater than D3
or D2 is less than D3 and the transverse dimension of the blown container bottom is equal to D3.

Two configurations are thus concerned by this feature. In a first configuration, the container has a waist and the transverse dimensions D2 and D3 are the same.

In a second configuration, the container has a waist and the bottom has a greater transverse dimension than the convex portion above the waist.

According to a possible feature, the method comprises a step of extracting the blown container from the open blowing mould.

According to a possible feature, the blown container is extracted from underneath the blowing mould.

This is an easy way to extract the achieved container.

According to a possible feature, the blowing mould comprising a bottom part, the method comprises a step of moving the bottom part of the blowing mould on which rests the blown container away from the two side halves of the blowing mould.

This makes it possible to extract the blown container.

If there is no bottom part in the mould the blown container may just fall at the opening of the mould and be received by any appropriate receiving means.

According to another aspect, the invention is directed to an apparatus as defined in claim 13.

This apparatus has a longer duration of life than the prior art apparatus since the means for moving apart the two side halves of the mould are suitable for moving these two parts over a smaller distance than in the prior art and, therefore, are sized accordingly. They are subject to lesser mechanical inertia and constraints than in the prior art.

According to a possible feature, the apparatus comprises means for extracting the blown container from underneath the blowing mould.

According to another possible feature, the blowing mould comprising a bottom part, the apparatus comprises means for moving the bottom of the blowing mould on which rests the blown container away from the two side halves of the blowing mould.

BRIEF DESCRIPTION OF DRAWINGS

Embodiments of the present invention will now be described, by way of example only, with reference to the accompanying figures in which:

FIG. 6 illustrates a container and a mould both having another configuration;

FIG. 7A illustrates a three-part mould configuration enclosing a container;

FIG. 7B is a view of the FIG. 7A mould in the open position and the container during its extraction;

FIG. 8 illustrates a container and a three-part mould both having another configuration;

FIG. 9 is a view of still another arrangement of a mould enclosing a container.

DESCRIPTION OF THE PREFERRED EMBODIMENTS

Figure 1:
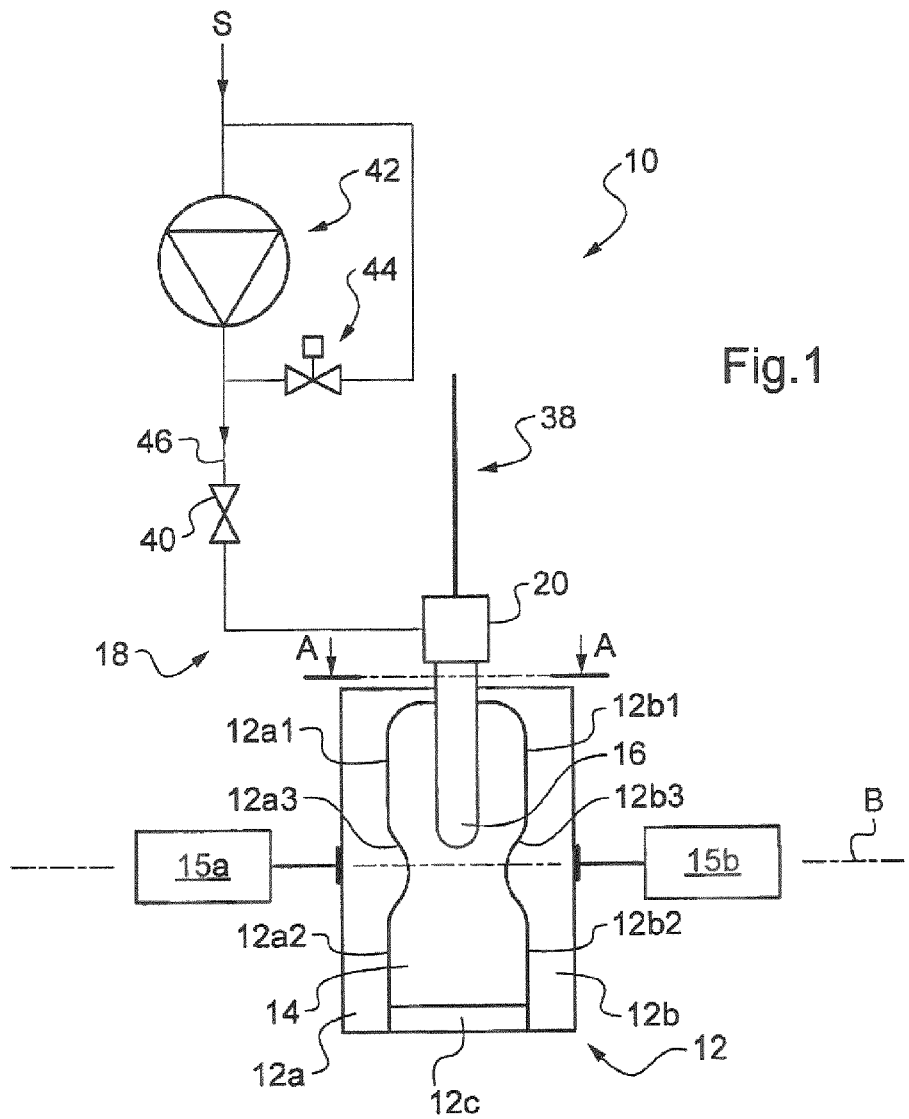
FIG. 1 is a schematic overall view of an apparatus according to an embodiment of the invention.

FIG. 1 schematically represents an apparatus 10 for simultaneously blowing and filling containers according to an embodiment of the invention, such as bottles, from preforms. However, it is to be noted that the invention is not limited to such an apparatus. For instance, filling of the blown containers may be achieved independently from the apparatus.

These preforms may be made of thermoplastic polymer.

Apparatus 10 comprises a blowing mould 12 for enclosing a preform. Such a preform is first manufactured through a moulding process and then heated before being positioned within mould 12 as disclosed in Applicant's patent EP 1 529 620 B1.

The preform usually assumes the shape of a cylindrical tube closed at its bottom end and open at its opposite end.

Mould 12 is for example a three-part mould of which two parts or side halves 12a, 12b define an inner cavity 14 when assembled together.

The third part 12c is a base or bottom part which contributes to defining inner cavity 14.

The apparatus 10 comprises moving means 15a and 15b arranged on either side of mould 12 for moving each of the two side halves 12a and 12b along an axis B which is, here, for example horizontal. In the remainder of the description axis B will be also referred to as a transverse axis.

Each moving means is for example a piston device which may be controlled by a processor or a computer. The piston device may be hydraulic or pneumatic.

Alternatively, the mould may be opened through a cam.

Firstly, the two side halves are spaced apart from each other for inserting a preform 16 therebetween.

Figure 2:
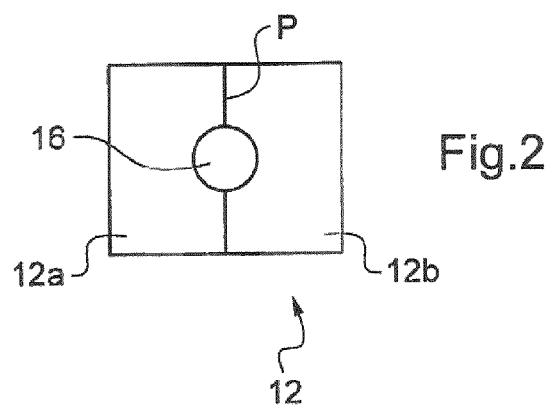
FIG. 2 is a top view on a cross-section AA of the FIG. 1 mould.

Next the two side halves 12a and 12b are moved back toward each other so as to come into contact along a joint plane P as represented in FIG. 2.

FIG. 2 is a top view on the cross-section plane AA of FIG. 1.

As represented in FIG. 1, preform 16 is inserted into cavity 14 before the beginning of a blowing and filling method according to the invention.

Once the preform has been positioned within mould 12 only the open end of the preform is visible from above the mould.

The shape of the cavity corresponds to the shape of the achieved container and it will be wholly occupied by the formed container at the end of the blowing and filling method.

Apparatus 10 further comprises a liquid injection circuit 18 and injection means for injecting a liquid into preform 16.

Injection means comprise an injection head 20 which comes into a sealing contact (for liquid tightness purpose) with mould 12 and preform 16.

Figure 3:
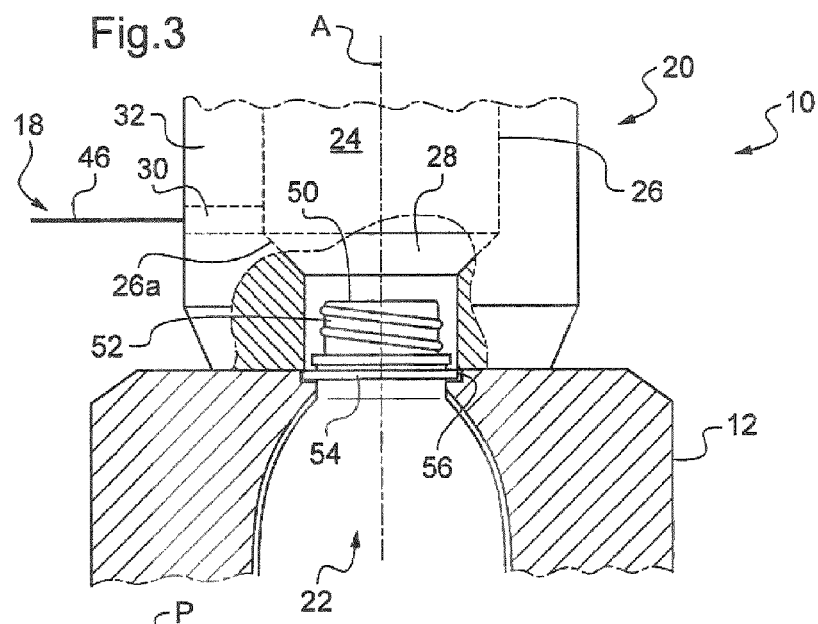
FIG. 3 is a schematic enlarged partial view of the injection head and mould of FIG. 1.

FIG. 3 is a schematic enlarged partial view of injection head 20 disposed above mould 12.

Mould 12 encloses a blown and filled container 22 (here, for example, a bottle filled with water) that has been obtained from preform 16 through the blowing and filling method that will be described subsequently.

The injection head comprises an injection valve device 24 that includes an injection nozzle 28 mounted within an inner housing 26.

Injection head 20 is substantially cylindrical in shape as partially illustrated in FIG. 3 and inner housing 26 is also cylindrical in shape and both are coaxial.

Injection valve device 24, and more particularly injection nozzle 28, is moveable along a longitudinal axis A between an injection position (open position) allowing liquid to be injected into the preform and a rest position (closed position) in which the injection nozzle 28 rests against an inner surface 26a of the injection head in a sealing engagement so as to prevent any flow of liquid from the injection head into the preform.

Longitudinal axis A is here the vertical axis along which injection head 20 and mould 12 are substantially aligned.

Axis A is a symmetry axis to container 22 as well as to preform 16.

As represented in FIG. 3, injection nozzle 28 is in the closed position (lower position) which is occupied when the container has been blown and filled at the end of the manufacturing method.

In the open position injection nozzle 28 is in an upper position at a distance from the inner surface 26a. This upper position is not represented in the drawing for the sake of clarity but it is located above a transverse channel 30 (represented in dotted lines) that is provided in a peripheral wall 32 of injection head 20.

This feed channel is connected to liquid injection circuit 18.

Moving the injection nozzle 28 away from inner surface 26a and above channel 30 makes it possible for the liquid that is in the circuit 18 to flow from channel 30 to the preform (in FIG. 3 the preform 16 of FIG. 1 is replaced with the formed container 22).

Reverting to FIG. 1, apparatus 10 also comprises stretching means 38 for stretching preform 16 when enclosed within mould 12.

Stretching means comprise a stretch rod 38 which is in a sliding connection with the injection nozzle 28.

In FIG. 3, the stretch rod is not represented for the sake of clarity. For example, stretch rod 38 may be in alignment with axis A and traverse injection nozzle 28 in a fluid-tight manner.

The stretch rod 38 of FIG. 1 embodiment is actuated upon command to be inserted downwardly into preform 16 so as to stretch the latter while a filling liquid is injected thereinto with a view to causing expansion of said preform within the mould.

Actuating means for actuating rod 38 have not been represented for the sake of clarity.

Apparatus 10 comprises a valve device 40 that enables flowing of liquid through circuit 18 when opened and prevents liquid from flowing through the valve device and downstream thereof when closed.

Valve device 40 is actuated upon command.

Liquid to be injected into the preform, e.g. water, is supplied from a source of liquid S which feeds said liquid to a pump device 42 of system 10.

Pump device 42 is located upstream of valve device 40.

Such a pump device is suitable for delivering a constant pressure, e.g. between 3 and 7 bars.

Pump device 42 is suitable for providing a predetermined volume of liquid and pushing it through liquid injection circuit 18.

As further represented in FIG. 1, a flow valve 44 is mounted in parallel of pump device 42 as a safety valve.

This valve acts as a discharge valve in order to protect the pump device, for instance when the liquid pressure is building up or if there is no container being manufactured.

Apparatus 10 comprises a duct 46 that is connected to pump device 42 at one end and to injection head 20 at the opposite end. Valve device 40 is mounted onto duct 46. It is to be noted that duct 46 is part of liquid injection circuit 18.

In the course of performance of the blowing and filling method according to an embodiment of the invention, the stretch rod 38 is actuated during a stretching phase whereas valve device 40 is in a closed position, thereby preventing liquid from being injected into preform 16.

Stretch rod 38 is downwardly engaged into the open end of the preform 16 so as to come into contact with the closed bottom end thereof. The stretch rod is then further actuated to push the closed end downwardly and stretch the preform accordingly in a controlled manner.

After a predetermined period of time has elapsed after the start of the stretching phase, the injection phase starts for injecting the liquid into the preform both for forming the container and filling it.

The injection phase starts with the opening of valve device 40 and operation of pump device 42. Actuation of valve device 40 may be controlled through a processor or a computer or manually.

Also injection nozzle 28 is actuated to be raised in its upper position (open position).

Pump device 42 is operated in a controlled manner so that liquid is pushed or displaced through liquid injection circuit 18 and injection head 20 to preform 16 (for being injected thereinto) in accordance with a predetermined injection or filling curve. Liquid is injected into preform 16 while the preform is being stretched so as to cause expansion of said preform within mould 12. EP 1 529 620 B1 provides further details on an embodiment of a blowing and filling method.

In FIG. 3 only the upper part of a blown and filled container has been represented at the end of the injection phase.

As illustrated, the open end of the preform has been shaped into a dispensing opening 50 that protrudes from above the mould.

Opening 50 has a neck 52 with an outside thread and a flange or neck ring 54 that is provided at the basis of the neck.

In particular, neck ring 54 rests against a shoulder 56 provided at the upper part of the mould around the container 22.

The blown and filled container 22 assumes the complementary shape to that of the inner walls of the mould illustrated in FIG. 1.

In FIG. 1, each mould side half has on its inner wall an upper recessed portion 12a1 (resp. 12b1), a lower recessed portion 12a2 (resp. 12b2) and a middle protruding portion 12a3 (resp. 12b3) which will contribute to forming the waist of the container.

Thus, the transverse dimension of each middle protruding portion is greater than the transverse dimension of each upper and lower recessed portion.

Once the container has been blown and filled with liquid it has to be removed from the mould. It is to be noted that the container may be provided with a sealing cap before being removed from the mould.

Figure 4A:
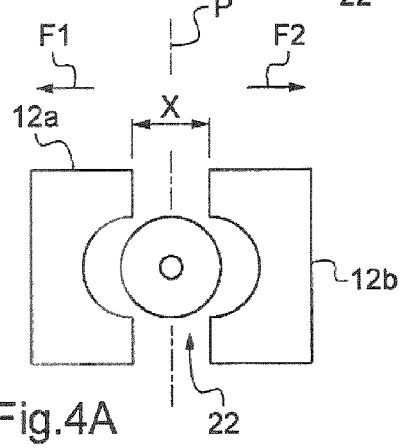
FIGS. 4A and 4B are respective top and side views illustrating the spacing between two mould side halves and a blown container according to the invention.
Figure 4B:
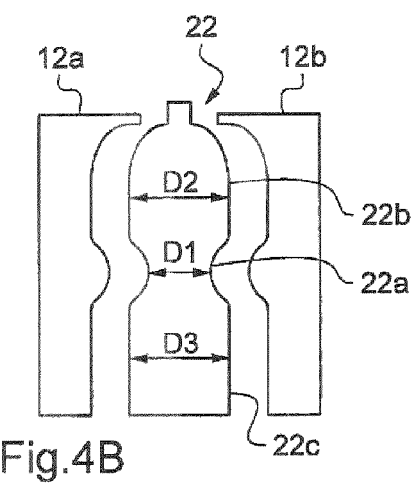

FIGS. 4A and 4B illustrate respectively a top view and a side view (identical to FIG. 1) of the two mould side halves 12a and 12b relative to the container 22 in an open position of the mould.

This open position has been obtained by commanding the actuation of FIG. 1 moving means 15a and 15b accordingly so as to move side halves 12a and 12b away from the joint plane P along transverse axis B as indicated by arrows F1 and F2 in FIG. 4A.

As represented in FIG. 4B, the container 22 comprises a waist 22a having a first transverse dimension D1 and a second and third convex portion 22b and 22c that are arranged on either part of the waist.

Each convex portion 22b, 22c has a transverse dimension D2, D3 respectively.

In the present embodiment, D1 is less than D2 and D3 and D2 is equal to D3.

In other embodiments D2 may be different from D3.

As represented in FIGS. 4A and 4B, the two mould side halves 12a and 12b are moved apart from each other over an overall distance X which is the sum of the distances travelled by each mould side half from the joint plane P.

In this embodiment, the overall distance X is equal to half the difference between the transverse dimensions D2 and D1 given the configuration (shape and transverse dimensions) of the container.

As represented in FIG. 4B, this reduced displacement of the two mould halves makes it possible to remove or extract the container from underneath the mould, e.g. by gravity or thanks to additional removal or extracting means such as a grasping arm or lever or the like.

In case the container has been filled with liquid, extraction of the latter out of mere gravity is made possible upon the opening of the mould.

In case a gas has been used as a forming fluid instead of a liquid during the stretch-blow moulding method, ejection or extraction of the blown container from underneath the mould may be achieved under the propelling action of the gas introduced into the container for its forming. The gas, e.g. air, has been introduced into the container through its upper open end and propels the container downwardly at the mould opening.

It is to be noted that, whatever the forming process (liquid or gas), the blown container may drop off onto a conveying device disposed under the manufacturing station (mould . . . ).

Figure 5A:
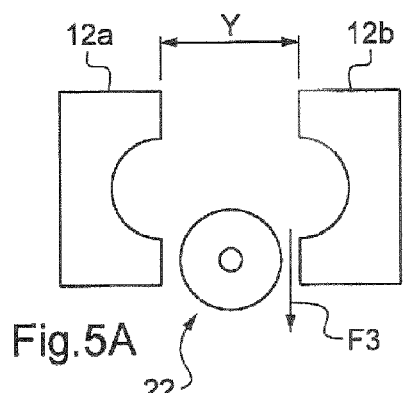
FIGS. 5A and 5B are respective top and side views illustrating the spacing between two mould side halves and a blown container according to the prior art.
Figure 5B:
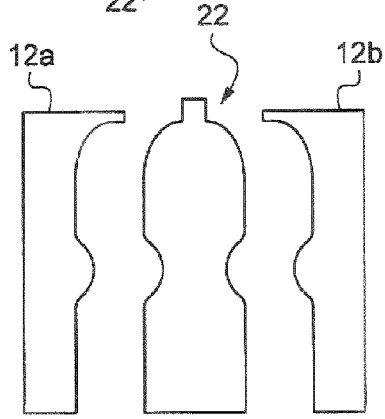

FIGS. 5A and 5B illustrate respectively similar views to those of FIGS. 4A and 4B.

However, FIGS. 5A and 5B illustrate the way mould 12 is opened according to the prior art.

More particularly, the two mould side halves 12a and 12b are spaced apart from each other over an overall distance Y that is greater than the greatest transverse dimension D2 or D3 of the container.

This is because in the prior art the container 22 is laterally removed from the mould as indicated by the arrow F3 in FIG. 5A.

Thanks to the invention it is no longer required to travel the mould parts over such a great distance since removal or extraction of the formed container from the mould is performed from underneath. Demoulding of the blown container is performed in the direction of its longitudinal axis.

Thus, the actuation means which are necessary for moving the two mould parts need not to be as robust as in the prior art and are less subject to wear and damages. They may therefore be sized accordingly and be cheaper.

Their expectancy of life duration is therefore increased. Also maintenance issues are reduced.

The whole manufacturing method is thus more efficient than in the prior art and its time of cycle may be reduced.

Furthermore, removing or extracting the container from underneath the mould either by gravity or through downwardly oriented propelling forces makes it possible to efficiently control the standing up or vertical stability of the container once it has been received on a supporting device, e.g. a conveying device.

In contrast, in the prior art once the containers have been filled with liquid they are handled by their neck for being extracted laterally (FIG. 5A).

This then leads to swinging of the handled filled containers and, therefore, renders their subsequent transfer more difficult to control and less efficient.

FIG. 6 illustrates a container 60 with a waist 60a located between two convex portions: an upper portion 60b and an enlarged lower portion 60c.

In this embodiment, the waist has a transverse dimension D1 that is less than the transverse dimension D2 of upper portion 60b, the latter being, in turn, less than the transverse dimension D3 of lower portion 60c.

With this configuration the two mould halves 62a and 62b of the mould 62 are displaced over an overall distance that is (D2−D1)/2 as for the FIGS. 4A-B embodiment. The same advantages are obtained and will not ne repeated.

FIG. 7A represents a mould 70 made of three parts: two side halves 70a, 70b and a bottom or base part 70c.

Mould 70 encloses a blown container 72 that has substantially the same shape as container 22.

Container 72 has a bottom which rests against base part 70c at the end of the blowing method. Optionally, blown container 72 has been filled with a liquid, e.g. water.

The base part 70c has the same transverse dimension D1 as the container waist 72b.

As for the previous embodiments side halves 70a and 70b are spaced apart from each other over the overall distance (D2−D1)/2.

At the same time, before or subsequently, base part 70c is laterally withdrawn either from the position occupied in FIG. 7A or at a lower height as represented in FIG. 7B.

FIG. 7B is a view of the mould in the open position while the container is falling (either by gravity or under the propelling action of a gas that has been used for forming the container). This position may have been obtained by lowering base part 70c over a predetermined height (after spacing apart the two side halves or simultaneously) and then withdrawing it laterally as indicated by the horizontal arrow.

This withdrawal is made swiftly while an upper part of the container is still located between side halves 70a and 70b so as to avoid or, at least, limit any swinging or tilting movement of the container.

Further handling of the extracted container is the same as explained above with reference to FIGS. 4A and 4B.

FIG. 8 illustrates a three-part mould 80 with two side halves 80a, 80b and a base part 80c.

Mould 80 encloses a blown and possibly liquid-filled container 82 which is supported by base part 80c.

Container 82 has a waist 82a with a transverse dimension (diameter) D1 separating an upper convex portion 82b with a transverse dimension (diameter) D2 and a lower convex or bulging portion 82c with a transverse dimension (diameter) D3.

As shown in FIG. 8, D3 is greater than D2 which, in turn, is greater than D1.

Base part 80c has a transverse dimension D4 which is greater than D2 and less than D3.

In this embodiment the container and/or mould configuration that has to be taken for adjusting the spacing distance between the two side halves 80a and 80b is given by the greater transverse dimensions, i.e. D3 and D4.

Thus, with the FIG. 8 configuration side halves 80a and 80b have to be spaced apart from each other by an overall distance (D3−D4)/2 so as to release the container from the mould and make it possible to remove or extract it from underneath.

Extraction of the container 82 may be achieved as explained with reference to FIGS. 7A and 7B.

As represented in FIG. 9, a two-part mould 90 comprising two side halves 90a and 90b encloses a blown and possibly liquid-filled container 92.

Container 92 comprises a neck 92a and, at the opposite, a bottom 92b as well as a body 92c therebetween.

Neck 92a has a transverse dimension that is less than that of bottom 92b.

Furthermore, the transverse dimension of the container body 92c between neck 92a and bottom 92b keeps increasing, thereby resulting in a conical or frusto-conical shape.

Thus, the two mould halves are only spaced apart by an overall distance that corresponds to the transverse dimension of the container neck for enabling extraction of the container.

It is to be noted that the opening or spacing distance is the same if the transverse dimension of the container body is constant between the neck and the bottom (cylindrical shape).

In a variant embodiment mould 90 may include a base part 92c as represented in dotted lines. All what has been described above relative to the mould embodiments including a base part applies here and will not be repeated.

The invention claimed is:

1. A method of manufacturing a blown container in a blowing mold, the blown container having a neck and a bottom aligned along a longitudinal axis and being enclosed within a blowing mold, the blowing mold comprising a first side half and a second side half, the first side half comprises a first side half mold face and the second side half comprises a second side half mold face, the first side half mold face and the second side half mold face are in contact with each other along a joint plane when the blowing mold is in a closed position, the blown container having at least one transverse dimension in a longitudinal cross-section including the longitudinal axis, the method comprises moving apart the first side half and the second side half along a transverse direction to separate the first side half mold face from the second side half mold face, the first side half and the second side half being moved apart from the joint plane over an overall distance that is less than the greatest transverse dimension of the blown container and that enables extraction of the blown container from the blowing mold.

2. The method of claim 1, wherein the overall distance is dependent on the shape of the outer surface of the blown container and the at least one transverse dimension thereof.

3. The method of claim 2, wherein the overall distance is dependent on the transverse dimension of the neck of the blown container.

4. The method of claim 3, wherein the overall distance is equal to the transverse dimension of the neck when the transverse dimension is less than the transverse dimension of the bottom and the transverse dimension of the container between the neck and the bottom is being kept constant or increasing.

5. The method of claim 1, wherein the overall distance is equal to half the difference between the greatest and the smallest transverse dimensions of the blown container when the transverse dimension of the bottom is less than the greatest transverse dimension of the blown container.

6. The method of claim 1, wherein the blown container comprises a waist having a first transverse dimension D1 that is less than a second and a third transverse dimension D2 and D3 respectively of two respective convex portions of the blown container arranged on either part of the waist.

7. The method of claim 6, wherein the overall distance is equal to half the difference between the transverse dimensions Di and D1, where i equals 1 or 2.

8. The method of claim 7, wherein the difference between the transverse dimensions is (D2−D1) if
the convex portion with the transverse dimension D2 is arranged above the waist and
either D2 is equal to or greater than D3
or D2 is less than D3 and the transverse dimension of the blown container bottom is equal to D3.

9. The method of claim 1, comprising extracting the blown container from the open blowing mold.

10. The method of claim 1, wherein the blown container is extracted from underneath the blowing mold.

11. The method of claim 1, wherein the blowing mold comprises a bottom part, the method comprises moving the bottom part of the blowing mold on which rests the blown container away from the first side half and the second side half.

12. The method of claim 1, wherein, prior to moving apart the first side half and the second side half, the method comprises:
stretching a preform placed within the blowing mold; and
injecting a liquid into the preform to cause expansion of the preform within the blowing mold while the preform is being stretched, thereby leading to the blown and liquid-filled container.

* * * * *